United States Patent [19]

Brintazzoli

[11] Patent Number: 5,893,447
[45] Date of Patent: Apr. 13, 1999

[54] PRODUCT TRANSFER UNIT

[75] Inventor: Renato Brintazzoli, Pianoro, Italy

[73] Assignee: O.A.M. S.p.A., Rastignano, Italy

[21] Appl. No.: 08/662,131

[22] Filed: Jun. 12, 1996

[30] Foreign Application Priority Data

Jun. 15, 1995 [IT] Italy .................. BO95A0304

[51] Int. Cl.$^6$ .................................................. B65G 15/00
[52] U.S. Cl. .................... 198/343.2; 198/345.3; 198/370.07; 198/465.1; 198/468.11; 198/803.01
[58] Field of Search .............. 198/370.07, 468.11, 198/345.3, 343.2, 465.1, 803.01, 614, 597; 53/251, 257

[56] References Cited

U.S. PATENT DOCUMENTS

| 2,514,104 | 7/1950 | Sutherland | 198/343.2 |
| 3,934,701 | 1/1976 | Mooney et al. | 198/345.3 |
| 4,713,883 | 12/1987 | Santandrea et al. | 198/803.01 |
| 5,306,877 | 4/1994 | Tas | 198/370.07 |
| 5,584,160 | 12/1996 | Andrea | 198/345.3 |

FOREIGN PATENT DOCUMENTS 2410589  9/1974  Germany.

*Primary Examiner*—Joseph E. Valenza
*Assistant Examiner*—Mark Deuble
*Attorney, Agent, or Firm*—Spencer & Frank

[57] ABSTRACT

A transfer unit for products, wherein a transfer device, moving back and forth in a given direction, connects a first and second conveyor located side by side at a transfer station and presenting respective first and second pockets for conveying the products; the first conveyor being operated continuously; and each first pocket presenting a respective actuating device moving in time with the transfer device and for arresting the first pocket at the transfer station to transfer a product from the second conveyor to the first conveyor.

6 Claims, 3 Drawing Sheets

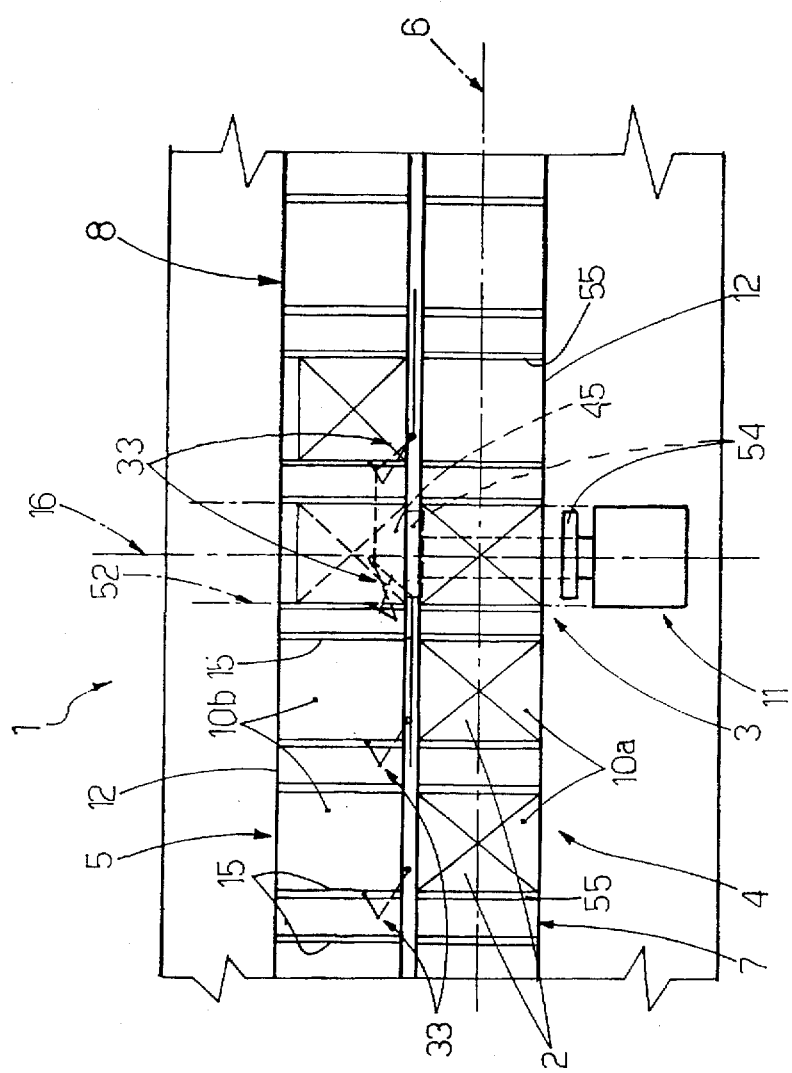
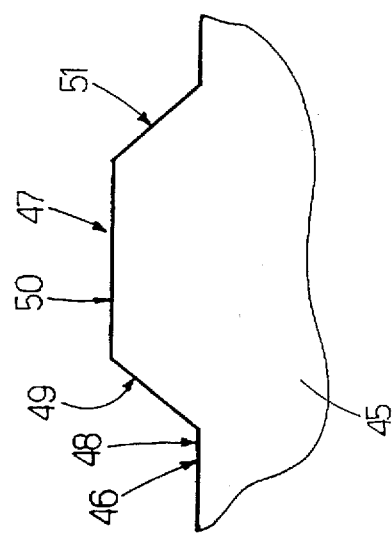
Fig. 1
Fig. 1a

PRODUCT TRANSFER UNIT

BACKGROUND OF THE INVENTION

The present invention relates to a product transfer unit.

On packing machines, and particularly cartoning machines, products are transferred between two adjacent operating units at transfer stations between two parallel supply lines by means of a transfer unit for feeding the products from one line to the other. The two lines are defined by conveying devices presenting a number of pockets, each connected rigidly to the movable element of the respective conveying device, and each designed to house a product of a given shape and size. Normally, the pockets are equally spaced along the transportation branches of the conveying devices.

Obviously, efficient operation of the machine as a whole is easily assured when the two conveying devices feed the respective pockets in steps and in time with each other, so that each pair of facing pockets defines, along the transportation branch, a product conveying channel crosswise to the traveling direction of the conveying devices. The transfer unit presents a single transfer member moving reciprocatingly in a direction perpendicular to the traveling direction of the conveying devices to connect two pockets arrested at the transfer station.

If the output conveying device is operated continuously, the input conveying device must also be operated likewise. More specifically, the two conveying devices must be so timed that the respective pockets travel in pairs to define a conveying channel for the products. Understandably, the transfer device must therefore provide for transferring the products with the pockets of the two conveyors in motion, and must therefore comprise a number of transfer members, the motion of which is a combination of the continuous motion of the product in the traveling direction of the conveying devices, and the reciprocating motion of the transfer member for transferring the product crosswise to the traveling direction of the conveying devices. This therefore results in a highly complex transfer device in turn resulting in complex setup and maintenance of the cartoning machine.

SUMMARY OF THE INVENTION

It is an object of the present invention to provide a transfer unit wherein a first and second conveying device, located side by side and respectively operating continuously and in steps, communicate with each other by means of a transfer device moving reciprocatingly in time with the second device.

According to the present invention, there is provided a transfer unit for products, the unit comprising a transfer station; at least a first conveying device presenting a transportation member, a respective transportation branch of which extends in a first traveling direction at said transfer station; and a transfer assembly for transferring said products and in turn comprising a pusher movable through said transportation branch in a second direction perpendicular to said first direction; said first conveying device presenting a number of first pockets equally spaced along said transportation branch; and each first pocket presenting a first cradle open parallel to said second direction and presenting a substantially horizontal bottom wall; characterized in that the first conveying device moves continuously, and said pusher moves reciprocatingly; each said first pocket comprising guide means for guiding the movement of said first cradle extending in said second direction; said guide means being slidable, and presenting a portion integral with said transportation member, and a movable portion integral with said first cradle; and first actuating means being provided at said transfer station to move said first cradle reciprocatingly in relation to the corresponding transportation member and to and from an idle position in said first direction.

BRIEF DESCRIPTION OF THE DRAWINGS

A non-limiting embodiment of the present invention will be described by way of example with reference to the accompanying drawings, in which:

FIG. 1 shows a schematic plan view, with parts removed for clarity, of a transfer unit in accordance with the teachings of the present invention;

FIG. 1a shows a detail

DETAILED DESCRIPTION OF THE INVENTION

Figure 2:
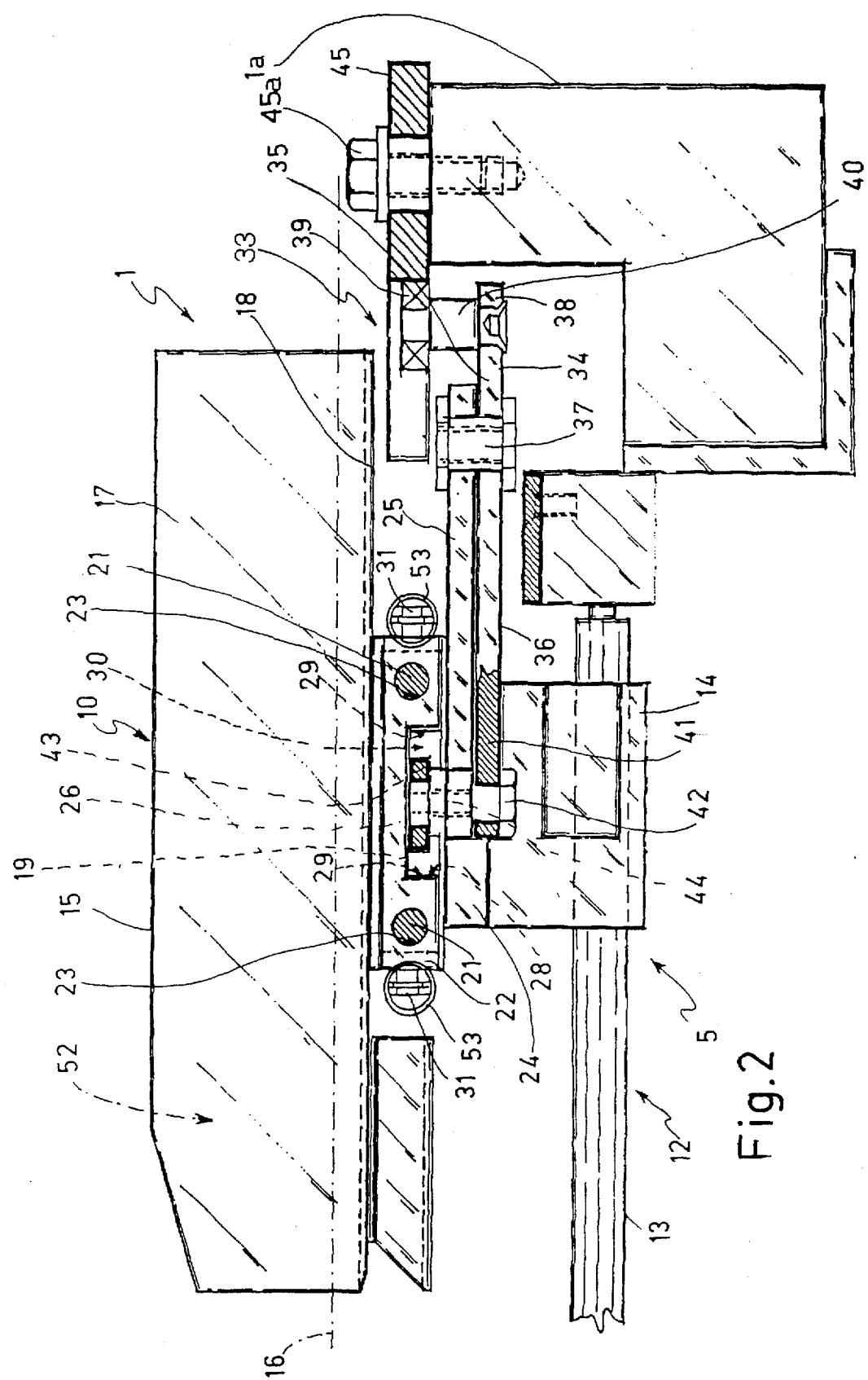
FIG. 2 shows a larger-scale side view, with parts removed for clarity, of a portion of FIG. 1.

Number 1 in FIG. 1 indicates a transfer unit for transferring products 2, and comprising a transfer station 3; an input conveyor 4 operating in steps; and an output conveyor 5 operating continuously; both conveyors 4 and 5 being endless conveyors, extending in a traveling direction 6 of products 2, and presenting respective upper transportation branches 7 and 8, and respective numbers of pockets 10a and 10b equally spaced with a first and second given spacing. Branches 7 and 8 are located side by side at station 3, at which unit 1 comprises a transfer assembly 11 for transferring products 2 between pockets 10a and 10b of conveyors 4 and 5, as described in detail later on.

With reference to FIGS. 1 and 2, conveyor 5 comprises a transportation member 12 comprising a number of cylindrical pins 13 equally spaced along branch 8 with their longitudinal axes perpendicular to direction 6, so as to define a horizontal surface along branch 8. Each pin 13 is fitted in angularly fixed manner with a parallelepiped support 14 located beneath and supporting pocket 10b as described in detail later on.

Each pocket 10b presents a cradle 15, which is open in a direction 16 perpendicular to direction 6 and presents two substantially vertical side walls 17 extending upwards from a substantially horizontal bottom wall 18. Each pocket 10b (FIG. 3) presents a parallelepiped projection 19 projecting downwards from wall 18 at the side wall 17 on the side of pocket 10b preceding cradle 15 in the traveling direction of conveyors 4 and 5. Projection 19 presents a pair of holes 20 parallel to direction 6, and each housing an end portion of a respective cylindrical pin 21 smaller in diameter than the height of projection 19 and parallel to direction 6. Pins 21 are maintained parallel to each other by a connecting member 22, which is similar to projection 19 and is engaged integrally, at respective holes 23, by the free ends of pins 21. Each pocket 10b also presents a substantially horizontal plate 24, which is located beneath wall 18, is fitted integral with projection 19, and presents an arm 25 extending on the opposite side of conveyor 5 to conveyor 4.

Wall 18 and plate 24 respectively define the top and bottom of a chamber, which, measured vertically, presents approximately the same height as projection 19 and houses pins 21.

Pocket 10b presents a body 26 partially engaging said chamber, and presenting two holes 27 parallel to direction 6 and the center distance of which substantially equals that of pins 21. Together, pins 21 and body 26 with holes 27 define a guide device 21a for guiding the movement of cradle 15 in direction 6. Body 26 is fitted rigidly to support 14, supports pocket 10b by means of pins 21 to which body 26 is connected in freely sliding manner, and presents, on the connecting member 22 side, a cavity 28 defined by two lateral walls 29 substantially parallel to pins 21, and by an end wall 30 perpendicular to pins 21. Body 26 also presents two substantially cylindrical appendixes 31 projecting outwards with their respective axes substantially coplanar with the axes of pins 21; and projection 19 presents two appendixes 32 substantially identical to appendixes 31. The function of appendixes 31 and 32 will be explained in detail later on.

Figure 3:
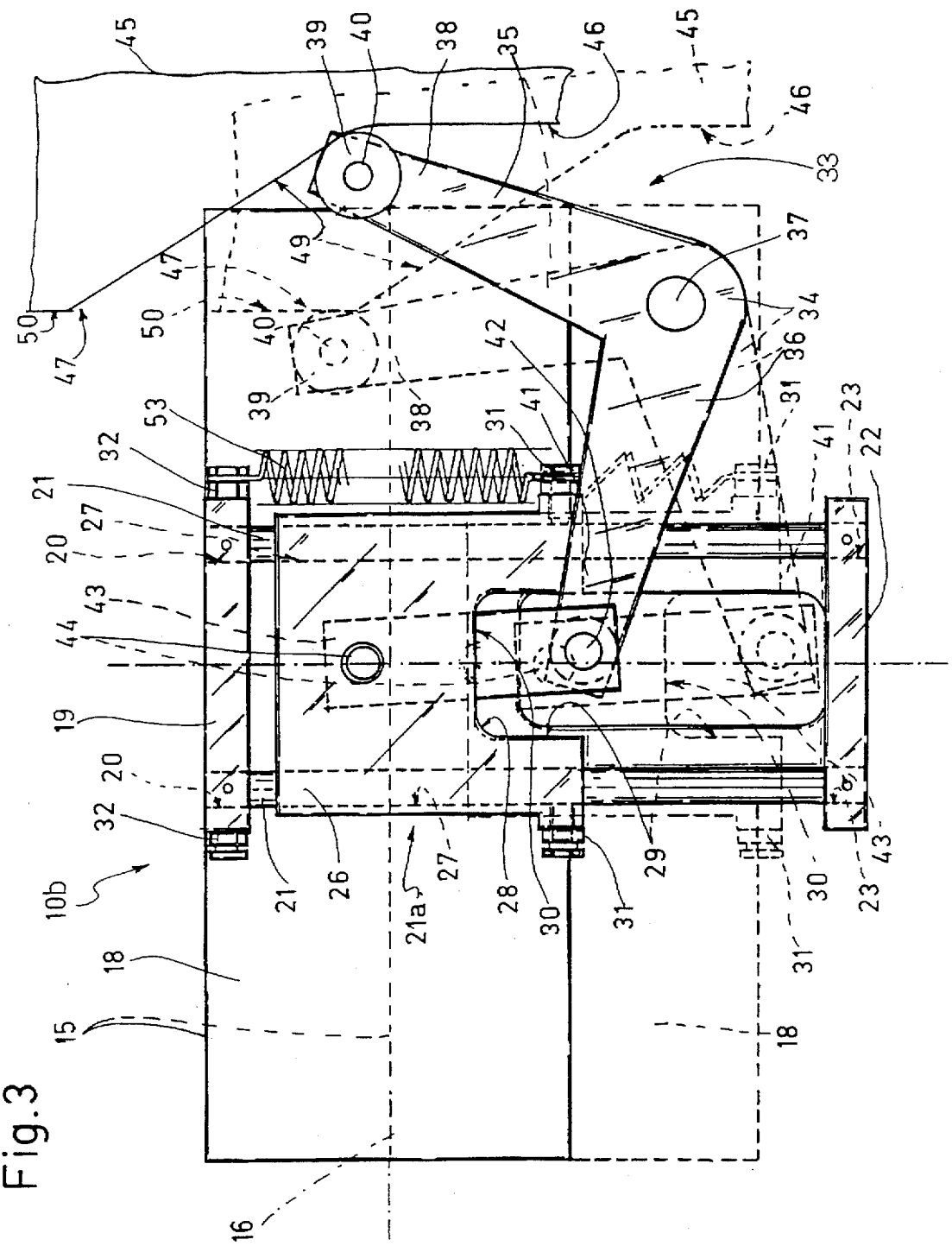
FIG. 3 shows an underside view, with parts removed for clarity, of the FIG. 2 portion in two successive operating positions.

With reference to FIGS. 2 and 3, pocket 10b comprises an articulated device 33 for varying the position of projection 19 in relation to body 26. For which purpose, device 33 comprises a rocker arm 34 presenting an arm 35 substantially parallel to direction 6 and extending in the traveling direction of products 2, and an arm 36 perpendicular to arm 35 and facing body 26. At the intersection of arms 35 and 36, rocker arm 34 is hinged by a vertical pin 37 to one end of arm 25; the free end 38 of arm 35 is fitted with a tappet roller 39 via the interposition of a vertical pin 40; and the free end 41 of arm 36 is hinged by a pin 42 to a lever 43 connecting rocker arm 34 to wall 18 of cradle 15 via the interposition of a pin 44. As shown in FIG. 3, therefore, when rocker arm 34 is rotated anticlockwise, projection 19 is moved away from body 26, i.e. the distance between cradle 15 and the preceding pocket 10b is reduced, and the distance between cradle 15 and the following pocket 10b is increased. That is to say, cradle 15 is slowed down. Conversely, when rocker arm 34 is rotated clockwise, projection 19 is moved towards body 26, i.e. the distance between cradle 15 and the preceding pocket 10b is increased, and the distance between cradle 15 and the following pocket 10b is reduced. That is to say, cradle 15 is accelerated.

On the opposite side of conveyor 5 to conveyor 4, device 33 also comprises a horizontal cam 45 (see FIG. 1a) fitted by screws 45a (see FIG. 2) to a frame 1a of unit 1, and which is located on a level with roller 39 with which it cooperates by means of an edge 46 presenting a step portion 47 extending towards conveyor 5 from a portion 48 parallel to direction 6 and for releasing roller 39. More specifically, at transfer station 3, portion 47 presents, in succession in the traveling direction of transportation member 12, an inclined leading portion 49 for rotating rocker arm 34 anticlockwise and so slowing down cradle 15 in relation to transportation member 12; an idle portion 50 parallel to portion 48; and a further inclined portion 51 for accelerating cradle 15 and so restoring it to a distance equal to the spacing of the preceding and following cradles 15.

Obviously, the profile of portion 49 determines the manner in which pockets 10b are slowed down, which, in this case, also includes the stoppage of each pocket 10b facing transfer assembly 11 at station 3.

Device 33 also comprises a pair of springs 53 (only one shown in FIG. 3), each extending between two facing appendixes 31 and 32, so that, when roller 39 engages portion 48, pocket 10b is maintained in the idle position with body 26 and projection 19 pushed against each other and cradle 15 equidistant in relation to the preceding and following pockets 10b; whereas, when roller 39 engages portion 47, springs 53 provide for maintaining rolling contact between roller 39 and portion 47.

With reference to FIG. 1, conveyor 4 differs from conveyor 5 as to the manner in which pockets 10a are advanced, and by pockets 10a being defined by cradles 55 substantially identical to cradles 15 but connected rigidly in known manner (not shown) to pins of conveyor 4 substantially equivalent to pins 13.

It should be pointed out that conveyor 4 is so operated as to successively arrest pockets 10a at station 3.

Transfer assembly 11 presents a single pusher 54 moving reciprocatingly, parallel to direction 16 and in time with conveyor 4, along a channel 52 defined by two pockets 10a, 10b arrested at transfer station 3. To transfer products 2 from pockets 10a to pockets 10b, portion 47 arrests each pocket 10b facing pusher 54 long enough to enable pusher 54 to move along channel 52 and transfer product 2 from pocket 10a to pocket 10b.

In actual use, once conveyors 4 and 5 are activated, conveyor 4 supplies products 2 to station 3 in respective pockets 10a. As an empty pocket 10b of conveyor 5 enters station 3 (continuous line in FIG. 3), roller 39 of device 33 engages portion 49 to slow down the corresponding cradle 15 (dotted line in FIG. 3) and eventually arrest it facing pusher 54. At the same time, conveyor 4 arrests a respective pocket 10a in station 3, and pusher 54 is moved by transfer assembly 11 along channel 52 defined by the two pockets 10a and 10b to transfer product 2 from conveyor 4 to conveyor 5. At this point, pusher 54 is withdrawn along channel 52, device 33 obviously moving cradle 15 further away from support 14 until pusher 54 is withdrawn completely from channel 52; and roller 39 engages portions 50 and 51 so that cradle 15 regains ground in relation to the preceding pocket 10b so that it is once more equidistant in relation to the adjacent pockets 10b.

Connecting a step-operated and a continuously-moving device therefore provides for exploiting the advantages of both.

Clearly, changes may be made to unit 1 as described and illustrated herein without, however, departing from the scope of the present invention.

For various reasons, unit 1 may be so formed as to comprise a conveyor 4 substantially identical to conveyor 5, in which case, conveyor 4 must be modified and respective pockets 10a replaced by others identical to pockets 10b.

I claim:

1. A transfer unit (1) for products, the unit comprising a transfer station (3); at least a first conveying device (5) presenting a transportation member (12), a respective transportation branch (8) of which extends in a first traveling direction (6) at said transfer station (3); and a transfer assembly (11) for transferring said products and in turn comprising a pusher (54) movable through said transportation branch (8) in a second direction (16) perpendicular to said first direction (6); said first conveying device (5) presenting a number of first pockets (10b) equally spaced with a first spacing along said transportation branch (8); and each first pocket (10b) presenting a first cradle (15) open parallel to said second direction (16) and presenting a substantially horizontal bottom wall (18); characterized in that the first conveying device (5) moves continuously, and said pusher (54) moves reciprocatingly; each said first pocket (10b) comprising guide means (21a) for guiding the movement of said first cradle (15) extending in said second direction (16); said guide means (21a) being slidable, and presenting a portion (26) integral with said transportation member (12), and a movable portion integral with said first cradle (15); and first actuating means (33) being provided at said transfer station (3) to move said first cradle (15) reciprocatingly in relation to the corresponding transportation member (12) and to and from an idle position in said first direction (6).

2. A unit as claimed in claim 1 characterized in that each said first pocket (10b) presents a respective base (14) by which the first pocket (10b) is connected to said transportation member (12); said first actuating means (33) comprising a fixed cam (45) presenting an edge (46) substantially perpendicular to said bottom walls (18) of the first pockets (10b) of said transportation branch (8), and an articulated device (33) presenting a rocker arm (34) in turn presenting two arms (35, 36) substantially similar and perpendicular to each other and each presenting a respective free end (38, 41); said rocker arm (34) being hinged to said base (14) at the intersection of said two arms (35, 36) by a hinge pin (37), the axis of which is substantially perpendicular to said bottom wall (18); a first end (38) of a first (35) of said two arms (35, 36) presenting a tappet roller (39) cooperating with said edge (46); and said articulated device (33) also comprising a lever (43), the ends of which are hinged respectively to the free end (41) of a second (36) of said two arms (35, 36), and to said base (14) to connect said rocker arm (34) to said base (14).

3. A unit as claimed in claim 2, characterized in that said cam (45) presents an active portion (47) comprising an idle portion (50) parallel to said first direction (6), and a first and second ramp (49, 51) defining said idle portion (50); said first ramp (49) rotating said rocker arm (34) so as to reverse said first cradle (15) in relation to said transportation member (12), increase the distance between said first cradle (15) and the first pocket (10b) preceding said first cradle (15), and reduce the distance between said first cradle (15) and the first pocket (10b) following said first cradle (15); and said second ramp (51) moving said first cradle (15) forward in relation to said transportation member (12) so that the distances between said first cradle (15) and the two first pockets (10b) adjacent to said first cradle (15) equal said spacing.

4. A unit as claimed in claim 3, characterized in that said cam (45) and said articulated device (33) are located beneath said first cradle (15).

5. A unit as claimed in claim 1, characterized by comprising at least a second conveying device (4) alongside said first conveying device (5); said second conveying device (4) comprising a number of second cradles (55) equally spaced with a second spacing; each of said second cradles (55) being substantially identical to a said first cradle (15).

6. A unit as claimed in claim 5, characterized in that said second conveying device (4) operates in steps in time with said transfer assembly (11), so that a first and second cradle (15, 55) define, at said transfer station (3), a channel (52) extending in said second direction (16) and for enabling a product (2) to be exchanged between said first and second conveying devices (5, 4).

* * * * *